Patented Jan. 30, 1945

2,368,208

UNITED STATES PATENT OFFICE 2,368,208

CHEMICAL COMPOUNDS AND METHOD OF PREPARING SAME

Albert K. Epstein and Morris Katzman, Chicago, Ill., assignors to The Emulsol Corporation, Chicago, Ill., a corporation of Illinois No Drawing. Application December 16, 1940, Serial No. 370,354

18 Claims. (Cl. 260—404.5)

This invention relates to new chemical compounds which are characterized by possessing interface modifying properties whereby the same are highly useful for the general purposes for which such agents are employed in the various arts.

While, in many instances, the novel compounds are best defined in the form of reaction products of stated materials, at least most of them may be considered as falling within the scope of the general formula

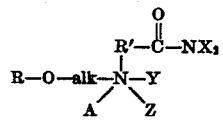

wherein R is an organic radical containing at least six carbon atoms, alk is alkylene or arylene,

is an aliphatic carboxylic acid acyl radical containing not more than six carbon atoms, Y and Z are hydrogen, alkyl, aryl, aralkyl, alkylol, alk—O—R, or

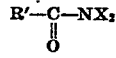

X is hydrogen, alkyl, aryl, aralkyl or alkylol, and A is an anion.

In the form of their free bases, such compounds are represented by the general formula

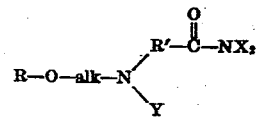

wherein the letters of the formula have the aforementioned significance.

A more limited aspect of the compounds of the invention may be respresented by the general formula

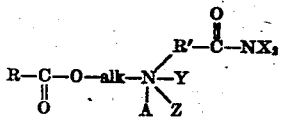

wherein

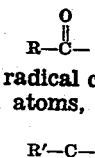

is a fatty acid acyl radical containing from eight to eighteen carbon atoms, alk is alkylene such as ethylene, $$R'-C-\underset{O}{\overset{\|}{}}$$

is a fatty acid acyl radical containing not more than six carbon atoms, Y and Z are hydrogen, alkylol, $$\text{alk—O—C—R, or } R'-C-NX_2$$
$$\overset{\|}{O} \qquad \overset{\|}{O}$$

X is hydrogen or alkylol, and A is halogen.

A particularly useful sub-class of the compounds of the present invention may be represented by the general formula

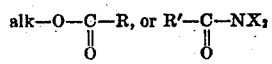

wherein

is a fatty acid acyl radical containing from twelve to eighteen carbon atoms, and X is hydrogen or alkylol.

The radical R in the above formulae may be of aliphatic (including cycloaliphatic), aromatic or aromatic-aliphatic character, and may contain substituent groups such as amino, hydroxy, halogen, sulphate, sulphonic, phosphate, carboxyl, nitrile and the like, as will be pointed out hereinafter, but it is particularly preferred that it be unsubstituted fatty and contain upwards of ten carbon atoms to about eighteen carbon atoms. Alk, Y, Z and R' likewise may contain substituent groups such as those mentioned, and the sequence of carbon atoms therein may be interrupted by O, S, C=O, NH, NR'' where R'' is alkyl, and the like.

In order that the invention may become apparent, there are listed hereinbelow representative compounds which fall within the scope of the invention.

(1) 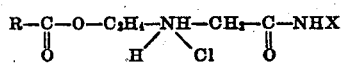

(2) $C_{17}H_{35}-C-O-C_2H_4-NH-CH_2-C-NH-C_2H_4OH$
     $\overset{\|}{O} \qquad H\diagdown Br \diagup \overset{\|}{O}$ (3) $C_7H_{15}-\overset{\|}{\underset{O}{C}}-O-C_2H_4 \quad H$
    $\qquad\qquad\qquad\qquad N-CH_2-C-NH-C_2H_4OH$
    $C_7H_{15}-C-O-C_2H_4 \quad Cl \quad \overset{\|}{O}$
    $\overset{\|}{O}$ (4) $C_{17}H_{33}-C-O-C_2H_4-N \begin{matrix} H & CH_2-C-NH-C_2H_4OH \\ & \overset{\|}{O} \\ Cl & CH_2-C-NH-C_2H_4OH \\ & \overset{\|}{O} \end{matrix}$
    $\overset{\|}{O}$

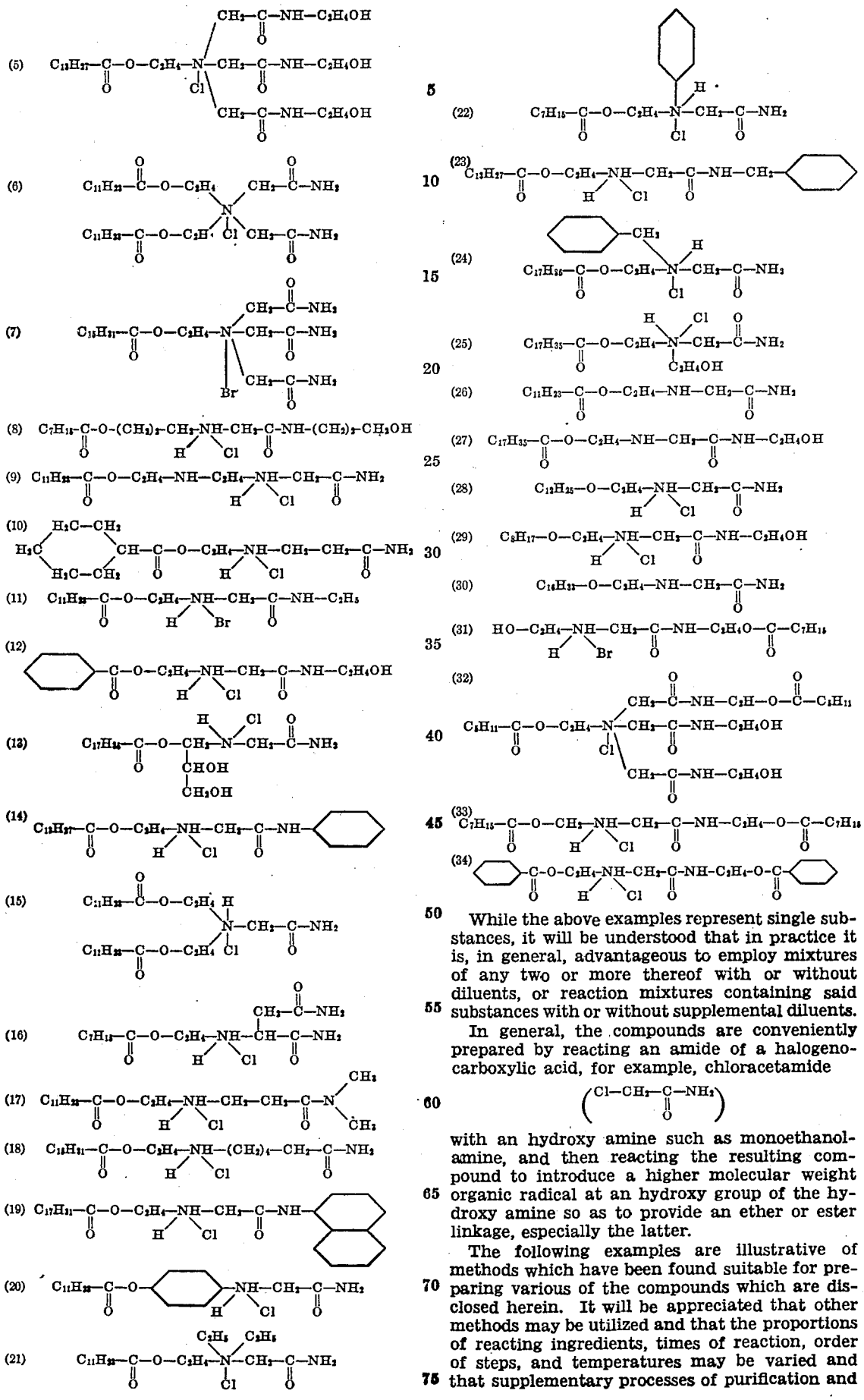

While the above examples represent single substances, it will be understood that in practice it is, in general, advantageous to employ mixtures of any two or more thereof with or without diluents, or reaction mixtures containing said substances with or without supplemental diluents.

In general, the compounds are conveniently prepared by reacting an amide of a halogenocarboxylic acid, for example, chloracetamide $$\left(Cl-CH_2-\underset{\underset{O}{\|}}{C}-NH_2\right)$$

with an hydroxy amine such as monoethanolamine, and then reacting the resulting compound to introduce a higher molecular weight organic radical at an hydroxy group of the hydroxy amine so as to provide an ether or ester linkage, especially the latter.

The following examples are illustrative of methods which have been found suitable for preparing various of the compounds which are disclosed herein. It will be appreciated that other methods may be utilized and that the proportions of reacting ingredients, times of reaction, order of steps, and temperatures may be varied and that supplementary processes of purification and

Example A (1) To a mixture of 200 cc. of 28% aqueous ammonia and 200 g. of crushed ice, 113 g. of chloracetyl chloride were added, with vigorous stirring. A white, flocculent precipitate formed which was filtered off, washed with water until free of the odor of ammonia, and then dried. About 80 g. of a dry powder comprising the amide of chloracetic acid

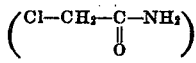

were obtained.

(2) To 50 g. of the amide of chloracetic acid, produced in part (1) hereof, 31 g. of monoethanolamine were added gradually, while constantly stirring, the mixture being maintained in an ice bath, the temperature rising from 25 degrees C. to 108 degrees C. in about 25 minutes. The resulting reaction product contained a substantial proportion of a compound having the formula

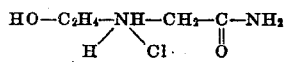

(3) To the reaction product of part (2) hereof, after the same had cooled somewhat, 100 g. of lauroyl chloride were added and the mixture was then heated at 125 degrees C., with stirring, until the evolution of hydrochloric acid ceased. The final product contained a substantial proportion of a compound having the formula

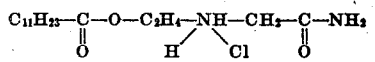

The product foamed in dilute acid solutions.

Example B (1) 2712 g. of methyl chloracetate were dissolved in 2712 g. of methyl alcohol and cooled to −10 degrees C. and there were then added slowly, with stirring and cooling, a mixture of 1550 g. of monoethanolamine dissolved in 1550 g. methyl alcohol. The addition took about one hour during which time the reaction mixture was kept at a temperature of about −10 degrees C. The reaction product was then maintained at a temperature of about 0 to −10 degrees C. for 12 hours. The methyl alcohol was then distilled off under a vacuum at a temperature of from 45 to 90 degrees C., the time of distillation being about six hours. The reaction product was essentially the chloracetic acid amide of monoethanolamine.

(2) To 145 g. of the chloracetic acid amide of monoethanolamine, produced in part (1) hereof, 62 g. of monoethanolamine were added, in about 5 g. to 10 g. portions and while stirring and cooling in an ice bath. The temperature of the reaction mass rose from 30 degrees C. to about 100 degrees C. in thirty minutes. The mass was then placed on a boiling water bath and a vacuum applied to draw off the volatile constituents. The reaction product remaining contained a substantial proportion of a compound having the formula

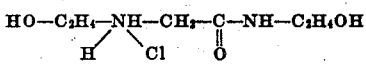

(3) 220 g. of lauroyl chloride were added, with stirring and under vacuum, to 220 g. of the reaction product produced in part (2) hereof. The addition of the lauroyl chloride was made over a period of about one hour during which time the reaction mixture was well stirred and kept at a temperature of about 80 to 120 degrees C. until evolution of hydrochloric acid practically ceased. The reaction product contained a substantial proportion of one or both of the following compounds.

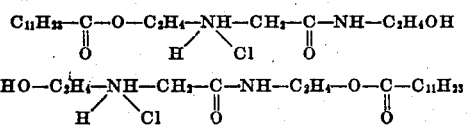

(4) 324 g. of caprylyl chloride were heated to 100 degrees C., under vacuum, and there were added thereto, slowly with stirring, 198 g. of the reaction product produced in part (2) hereof. The addition took about one hour at the end of which time practically all of the hydrochloric acid formed was evacuated from the system. The reaction product, which foamed in water, contained a substantial proportion of a compound having the formula

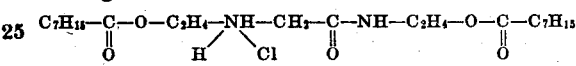

The organic acyl radical represented by

in the general formula hereinabove may be derived from straight chain and branched chain, saturated and unsaturated, carboxylic, aliphatic (including cycloaliphatic), fatty, aromatic, hydroaromatic, and araliphatic acids including caprylic acid, heptylic acid, caproic acid, capric acid, pimelic acid, sebacic acid, behenic acid, arachic acid, cerotic acid, erucic acid, melissic acid, stearic acid, oleic acid, ricinoleic acid, ricinelaidic acid, ricinostearolic acid, linoleic acid, linolenic acid, lauric acid, myristic acid, palmitic acid, mixtures of any two or more of the above mentioned acids or other acids, mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soya bean oil, peanut oil, castor oil, seal oils, whale oil, shark oil and other fish oils, partially or completely hydrogenated animal and vegetable oils such as those mentioned; oxidized hydroxy and alpha-hydroxy higher carboxylic, aliphatic and fatty and/or polymerized higher fatty acids or higher fatty acids derived from oxidized and/or polymerized triglyceride oils; acids such as i-hydroxy stearic acid, dihydroxypalmitic acid, di-hydroxystearic acid, dihydroxybehenic acid, alpha-hydroxy capric acid, alpha-hydroxy stearic acid, alpha-hydroxy palmitic acid, alpha-hydroxy lauric acid, alpha-hydroxy myristic acid, alpha-hydroxy coconut oil mixed fatty acids, alpha-hydroxy margaric acid, alpha-hydroxy arachidic acid, and the like; fatty and similar acids derived from various waxes such as beeswax, spermaceti, montan wax, coccerin, and carnauba wax and higher molecular weight carboxylic acids derived, by oxidation and other methods, from paraffin wax, petroleum and similar hydrocarbons; resinic and hydro-aromatic acids such as hexahydrobenzoic acid, naphthenic acid and abietic acid; araliphatic and aromatic acids such as phthalic acid, benzoic acid, Twitchell fatty acids, naphthoic acid, pyridine carboxylic acid; hydroxy aromatic acids such as salicylic acid, hydroxy benzoic and naphthoic acid, and the like and substitution and addition derivatives of the aforementioned acids, in particular, halogen addition and substitution derivatives. It will be understood that mixtures of any two or more of said acids may be employed if desired and it will also be appreciated that said acids may contain substituent groups such as sulphate, sulphonic, halogen, ketone and other groups. The acids are preferably utilized in the form of their acyl halides, but they may also be employed in the form of any acylating compound.

In the case of the higher molecular weight ether derivatives, which may be prepared, for example, by reacting an intermediate containing a reactive halogen with an alkali metal alcoholate substance, in accordance with general methods or procedures known in the art, the higher molecular weight radical or radicals may be derived from higher molecular weight alcohols or other derivatives corresponding to the carboxylic acids mentioned hereinabove.

The alcohol amines and hydroxy-alkyl amines utilized in the preparation of the novel compounds of the present invention may be selected from a large group including symmetrical, unsymmetrical, normal and iso-derivatives, such as monoethanolamine, diethanolamine, triethanolamine, monopropanolamine, dipropanolamine, tripropanolamine, triisopropanolamine, mono-butanolamine, mono-iso-butanolamine, monopentanolamine, dibutanolamine, tributanolamine, mono- and di-pentanolamine, mono- and di-hexanolamine, mono- and di-octanolamine, mono- and di-decylolamine, mono-laurylolamine, trilaurylolamine, mono - hexa - decylolamine, mono-octadecylolamine, mono-ethyl ethanolamine, morpholine, diethylaminoethanol, monobutyl ethanolamine; arylolamines and cyclic hydroxy amines such as cyclohexyl ethanolamine, N - cyclohexyl butanolamines, ethanolaniline, ethyl phenyl ethanolamine, phenyl diethanolamine, phenylethanolamine, p-amino phenol,

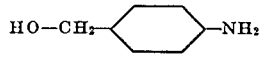

mono-ethyl diethanolamine, 2-methylamino-propan - diol - 1,3; 1-phenyl-amino-propan-diol-2,3; 1-hydroxy-ethylamino-2, methoxy-propan-ol-3; 2-N-methylamino-propan-diol-1,3; mono-ethanol monopropanolamine, monoethanol monobutanolamine, alkylol polyamines such as alkylol derivatives of ethylene diamine, diethylene triamine, and triethylene tetra-amine as, for example, hydroxy-ethyl ethylene diamine; diglycerol mono-amine; diglycerol di-amine; hydroxy-amines derived from other polyhydric alcohols, including glycols, sugars and sugar alcohols such as ethylene glycol, diethylene glycol, dextrose, sucrose, sorbitol, mannitol and dulcitol;

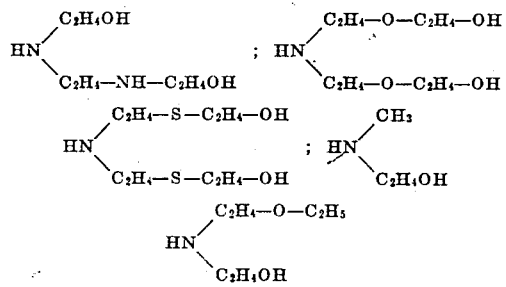

and the like; 1-amino-2,3-propanediol, 2-amino-1,3-propanediol; 2-amino-2-methyl-1,3-propanediol; trimethylol amino methane; 2-amino-2-n-propyl-1,3-propanediol; 2-amino-2-isopropyl-1,3-propanediol; 2-amino-2-methyl-1,4-butanediol; 2-amino-2-methyl-1,5-pentanediol; 2-amino-2-ethyl - 1,3 - propanediol; 2-amino-2-ethylol-1,3-propanediol; 2-amino-2-methyl-1,6-hexanediol; 1-amino-1,1-dimethylethanol; trimethylol aminomethyl methane; trimethylol amino-methylol methane. The glycerol mono-amines and the related hydroxy amines, such as various of those disclosed hereinabove, may be prepared by various procedures and in different ways. Many of them are conveniently produced by nitrating paraffin hydrocarbons, substituting methylol groups for hydrogen on the carbons to which the nitro groups are attached, and then reducing the nitro groups to amine groups. These amine groups may be further alkylated or otherwise substituted if desired. Polymerized hydroxy amines as prepared, for example, by polymerizing monoethanolamine, diethanolamine, triethanolamine, or mixtures thereof, or other hydroxy amines such as those mentioned hereinabove, particularly in the presence of a catalyst such as sodium hydroxide or the like, may also be employed. The preparation of polymerized hydroxy amines is disclosed, for example, in United States Patent No. 2,178,173. Homologues and substitution derivatives of the above-mentioned hydroxy amines may also be utilized. Because of commercial and other considerations, monoethanolamine is especially desirable. It will be understood that the hydroxy amines may be utilized in pure, impure or commercial form. The alcohol or alkylol radicals of the alcohol amines or alkylolamines may contain substituent groups such as amino, nitrile, carboxyl, hydroxy, halogen, sulphate, sulphonic, phosphate, and the like and the sequence of carbon atoms therein may be interrupted by O, S, C=O, NH, NR where R is lower alkyl, and the like.

The carboxylic acids whose acyl radicals are represented by the radical

in the above-mentioned formula include mono- and poly-carboxylic acids as, for example, acetic acid, propionic acid, butyric acid, isobutyric acid, valeric acid, caproic acid, benzoic acid, cinnamic acid, succinic acid, citric acid, tartaric acid, maleic acid, glutaric acid, and the like.

The alkyl, aryl and aralkyl radicals which may comprise the groups represented by the letters Y and Z in the general formulae set forth hereinabove include, by way of example, methyl, ethyl, propyl, butyl, amyl, hexyl, octyl, lauryl, phenyl, naphthyl, benzyl, and cinnamyl. The alkylol radicals which may also comprise Y and Z include ethanol, propanol, butanol, isopropanol, isobutanol and others such as are present in the hydroxy-alkyl primary and secondary amines mentioned hereinabove.

The anion represented by the letter A in the above-mentioned general formula is particularly halogen, such as chlorine, bromine or iodine, especially chlorine. Other anions, however, are nitrate, acetate, borate, phosphate, hydroxy, $HSO_4^-$, and the like.

The compounds are used as produced, namely, and particularly, in the form of their hydrochlorides. The free base may be obtained in known manner, for example, by treating the hydrochloride with a base, such as caustic soda, at low temperatures, generally of the order of about 0 degrees C. or slightly above.

The compounds of this invention have utility in various arts in which interface modifying agents are employed. They are resistant to precipitation by calcium and magnesium salts and are compatible with acid and alkali media. They may be utilized in washing and laundering and the textile and related industries wherein they function for softening, wetting, detergent, emulsifying, penetrating, dispersing, frothing and foaming purposes. The textiles, various treatments of which in the presence of the agents of the present invention are rendered effective, comprise natural products such as cotton, wool, linen and the like as well as the artificially produced fibres (and fabrics), such as rayon, cellulose acetates, cellulose ethers and similar artificial products. It will be understood, of course, that the agents may be used in aqueous and other media either alone or in combination with other suitable salts of organic or inorganic character or with other interface modifying agents. In the dyeing of textiles they may be employed as assistants in order to bring about even level shades. They may be used in the leather industry as wetting agents in soaking, dyeing, tanning and the softening and other treating baths for hides and skins. Their utility as emulsifying agents enables them to be employed for the preparation of emulsions which may be used for insecticidal, fungicidal and for similar agriculture purposes. They have utility in the preparation of cosmetic creams such as cold creams, vanishing creams, tissue creams, shaving creams of the brushless and lathering type and similar cosmetic preparations. They possess antiseptic, bactericidal and germicidal properties even when used in quite highly dilute aqueous solutions so that they are well adapted for medicinal and allied purposes. Another use to which the agents of the present invention may be placed is for the treatment of paper pulp and paper where they may be employed, for example, as penetrating agents in the cooking of the paper pulp or the like. Their capillary or interfacial tension reducing properties enables them to be employed in the fruit and vegetable industry in order to effect the removal from fruits and the like of arsenical and similar sprays. They possess marked utility in the ore dressing industry wherein they function effectively in froth flotation processes, particularly for the separation of silica from ores containing the same. Their interface modifying properties also permit their use in lubricating oils and the like enabling the production of effective boring oils, cutting oils, drilling oils, wire drawing oils, extreme pressure lubricants and the like. They may also be used with effect in the preparation of metal and furniture polishes, shoe polishes, in rubber compositions, for breaking or demulsifying petroleum emulsions such as those of the water-in-oil type which are encountered in oil field operations, and for various other purposes which will readily occur to those versed in the art in the light of the disclosure herein.

As detergents, they may be employed for the preparation of shampoos, dentifrices and the like. In general, they may be dissolved in water or aqueous media and utilized in that form or, in the case of solid products, they may be packaged and sold in such form preferably mixed with diluents. They may also be utilized for commercial cleansing, laundering and washing operations with marked advantage.

The products of the present invention may be employed alone or together with lesser or greater quantities of inorganic or organic compounds. Thus, for example, they may be employed together with salts such as sodium chloride, alkali metal phosphates including pyrophosphates and tetraphosphates, sodium sulphate, alums, perborates such as sodium perborate, and the like. They may be utilized in acid media in the presence of dilute acids such as hydrochloric, sulphurous, acetic and similar inorganic and organic acids. They may also be employed in the presence of such diverse substances as hydrophilic gums including pectin, tragacanth, karaya, locust bean, gelatin, arabic and the like, glue, vegetable, animal, fish and mineral oils, solvents such as carbon tetrachloride, monoethyl ether of ethylene glycol, monobutyl ether of ethylene glycol, monoethyl and monobutyl ethers of diethylene glycol, cyclohexanol, and the like. They may be used together with wetting, emulsifying, frothing, foaming, penetrating and detergent agents such as the higher molecular weight alkyl sulphates, phosphates, pyrophosphates and tetraphosphates, as, for example, lauryl sodium sulphate, myristyl sodium pyrophosphate, cetyl sodium tetraphosphate, octyl sodium sulphate, oleyl sodium sulphate, and the like; monoglycerides, diglycerides and partial esters of polyglycerols, such as mono-laurin, mono-olein, di-olein, oleic and stearic acid monoesters of polyglycerols; higher fatty acid monoesters of glycols, such as lauric acid mono-ester of diethylene glycol; higher molecular weight sulphonic acid derivatives such as cetyl sodium sulphonate and lauryl sodium sulphonate; sulphocarboxylic acid esters of higher molecular weight alcohols such as lauryl sodium sulphoacetate, di-octyl sodium sulpho-succinate, dilauryl potassium sulpho-glutarate, lauryl monoethanolamine sulphoacetate, and the like; sulphuric and sulphonic derivatives of condensation products of alkylolamines and higher fatty acids; phosphoric, pyrophosphoric and tetraphosphoric acid esters of higher molecular weight alcohols; Turkey-Red oils; compounds of the type of isopropyl naphthalene sodium sulphonate, and other classes of wetting agents.

Wherever the term "higher" is employed as referring to higher molecular weight organic acids or the like, it will be understood to cover compounds or radicals having at least eight carbon atoms unless otherwise specifically stated.

What we claim as new and desire to protect by Letters Patent of the United States is:

1. Chemical compounds corresponding to the general formula

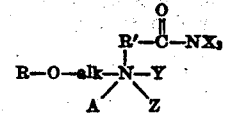

wherein R is an organic radical containing at least six carbon atoms, alk is a member selected from the group consisting of alkylene and arylene,

is an aliphatic carboxylic acid acyl radical containing not more than six carbon atoms, Y and Z are members selected from the group consisting of hydrogen, alkyl, aryl, aralkyl, alkylol, alk—O—R, and

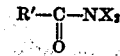

X is a member selected from the group consisting of hydrogen, alkyl, aryl, aralkyl and alkylol, and A is an anion.

2. Chemical compounds corresponding to the general formula

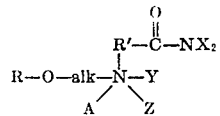

wherein R is an organic aliphatic radical containing from twelve to eighteen carbon atoms, alk is alkylene,

is a fatty acid acyl radical containing not more than six carbon atoms, Y and Z are members selected from the group consisting of hydrogen, alkyl, aryl, aralkyl, alkylol, alk—O—R, and

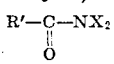

X is a member selected from the group consisting of hydrogen, alkyl, aryl, aralkyl and alkylol, and A is an anion.

3. Chemical compounds corresponding to the general formula

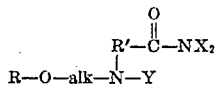

wherein R is an organic radical containing at least six carbon atoms, alk is a member selected from the group consisting of alkylene and arylene,

is an aliphatic carboxylic acid acyl radical containing not more than six carbon atoms, X is a member selected from the group consisting of hydrogen, alkyl, aryl, aralkyl and alkylol, and Y is a member selected from the group consisting of hydrogen, alkyl, aryl, aralkyl, alkylol, alk—O—R, and

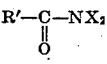

4. Chemical compounds corresponding to the general formula

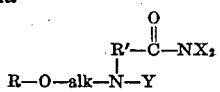

wherein R is an organic aliphatic radical containing from twelve to eighteen carbon atoms, alk is alkylene,

is a fatty acid acyl radical containing not more than six carbon atoms, X is a member selected from the group consisting of hydrogen, alkyl, aryl, aralkyl and alkylol, and Y is a member selected from the group consisting of hydrogen, alkyl, aryl, aralkyl, alk—O—R, and

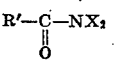

5. Chemical compounds corresponding to the general formula

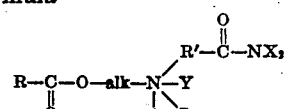

wherein

is a carboxylic acid acyl radical containing at least six carbon atoms, alk is a member selected from the group consisting of alkylene and arylene,

is an aliphatic carboxylic acid acyl radical containing not more than six carbon atoms, Y and Z are members selected from the group consisting of hydrogen, alkyl, aryl, aralkyl, alkylol, alk—O—R and

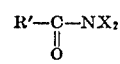

X is a member selected from the group consisting of hydrogen, alkyl, aryl, aralkyl and alkylol, and A is an anion.

6. Chemical compounds corresponding to the general formula

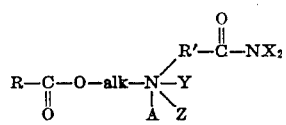

wherein

is a fatty acid acyl radical containing from twelve to eighteen carbon atoms, alk is alkylene,

is a fatty acid acyl radical containing not more than six carbon atoms, Y and Z are members selected from the group consisting of hydrogen, alkyl, aryl, aralkyl, alkylol, alk—O—R and

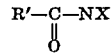

X is a member selected from the group consisting of hydrogen, alkyl, aryl, aralkyl and alkylol and A is halogen.

7. Chemical compounds corresponding to the general formula

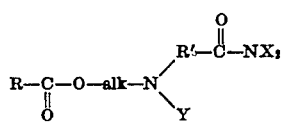

wherein

is a carboxylic acid acyl radical containing at least six carbon atoms, alk is a member selected from the group consisting of alkylene and arylene,

is an aliphatic carboxylic acid acyl radical containing not more than six carbon atoms, X is a member selected from the group consisting of hydrogen, alkyl, aryl, aralkyl and alkylol, and Y is a member selected from the group consisting of hydrogen, alkyl, aryl, aralkyl, alkylol, alk—O—R and

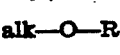

8. Chemical compounds corresponding to the general formula

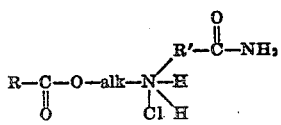

wherein

is a fatty acid acyl radical containing at least six carbon atoms, alk is alkylene, and

is a fatty acid acyl radical containing not more than six carbon atoms.

9. Chemical compounds corresponding to the general formula

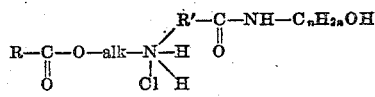

wherein

is a fatty acid acyl radical containing from twelve to eighteen carbon atoms, alk is alkylene,

is a fatty acid acyl radical containing not more than six carbon atoms, and $n$ is an integer.

10. Chemical compounds corresponding to the formula

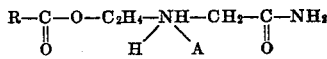

wherein

is the acyl radical of a fatty acid containing from eight to eighteen carbon atoms, and A is halogen.

11. A chemical compound having the formula

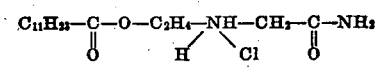

12. A chemical compound having the formula

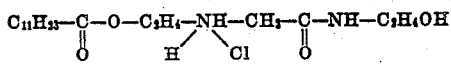

13. A method of preparing new chemical compounds which comprises condensing an amide of a halogeno-carboxylic acid with an hydroxy amine, and then reacting the resulting compound to introduce an organic radical containing at least six carbon atoms into the compound so as to provide a linkage selected from the group consisting of ether and ester linkages with an hydroxy group of the hydroxy amine radical.

14. A method of preparing new chemical compounds which comprises condensing an amide of a halogeno-carboxylic acid with an hydroxy amine, and then reacting the resulting compound with a carboxylic acid acyl halide containing at least six carbon atoms to esterify an hydroxy group of the hydroxy amine radical.

15. A method of preparing new chemical compounds which comprises condensing an aliphatic amide of an aliphatic halogeno-carboxylic acid and with an hydroxy-alkyl amine, and then reacting the resulting compound with a fatty acid acyl halide containing from twelve to eighteen carbon atoms to esterify an hydroxy group of the hydroxy-alkyl amine radical.

16. A method of preparing new chemical compounds which comprises condensing an amide of a halogeno-fatty acid with an hydroxy-alkyl primary amine, and then treating the resulting compound with a fatty acid acyl halide containing from twelve to eighteen carbon atoms to esterify the hydroxy group of the hydroxy-alkyl primary amine radical.

17. A method of preparing new chemical compounds which comprises condensing chloroacetamide with monoethanolamine and then treating the resulting compound with lauroyl chloride to esterify the hydroxy group of the monoethanolamine radical.

18. A method of preparing new chemical compounds which comprises condensing the amide of monoethanolamine and chloracetic acid with monoethanolamine, and then treating the resulting compound with a fatty acid acyl chloride containing at least six carbon atoms to esterify an hydroxy group of at least one of the monoethanolamine radicals.

ALBERT K. EPSTEIN.
MORRIS KATZMAN.